(No Model.)

M. JENSEN.
SOLDERING MACHINE.

No. 551,491. Patented Dec. 17, 1895.

Witnesses:

Inventor
Mathias Jensen
By Dewey & Co.
Attys

United States Patent Office.

MATHIAS JENSEN, OF ASTORIA, OREGON, ASSIGNOR OF ONE-HALF TO THE JENSEN CAN FILLING MACHINE COMPANY OF OREGON, OF SAME PLACE.

SOLDERING-MACHINE.

SPECIFICATION forming part of Letters Patent No. 551,491, dated December 17, 1895.

Application filed August 13, 1895. Serial No. 569,152. (No model.)

*To all whom it may concern:*

Be it known that I, MATHIAS JENSEN, a citizen of the United States, residing in Astoria, Clatsop county, Oregon, have invented an Improvement in Soldering-Machines; and I hereby declare the following to be a full, clear, and exact description of the same.

My invention relates to improvements in soldering-machines. Its object is to remove the surplus solder from the end seams of cans after being soldered by an ordinary soldering-machine.

It consists in a novel arrangement of wipers, in combination with an endless traveling carrier, and a device for heating the cans while being wiped, so as to prevent the solder from becoming hard before the operation is completed.

Figure 1:
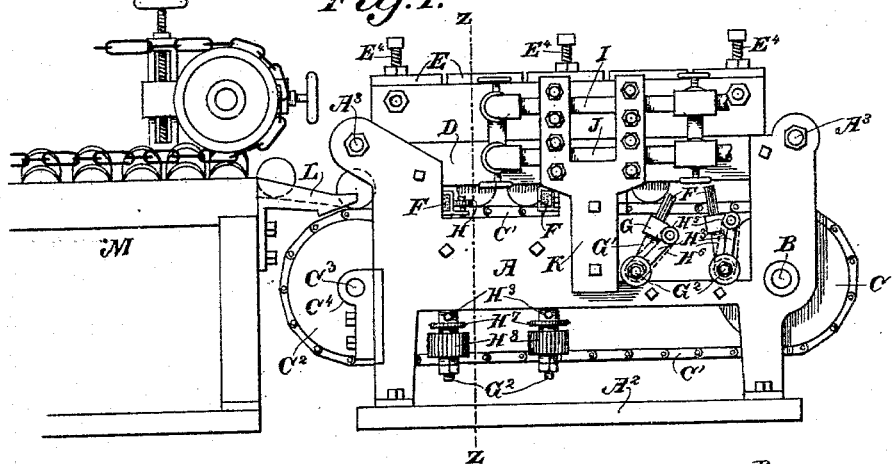
Figure 2:
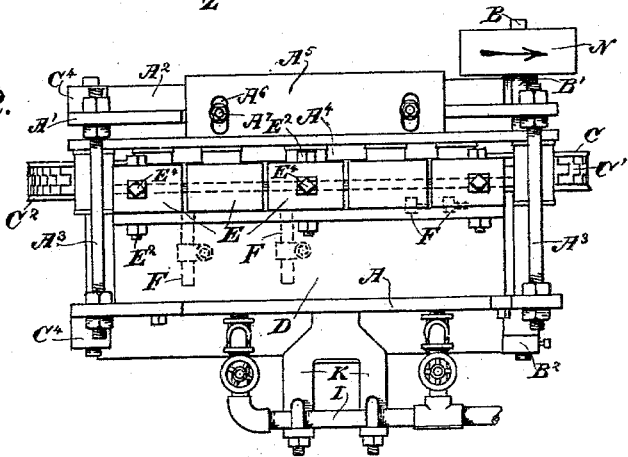
Figure 3:
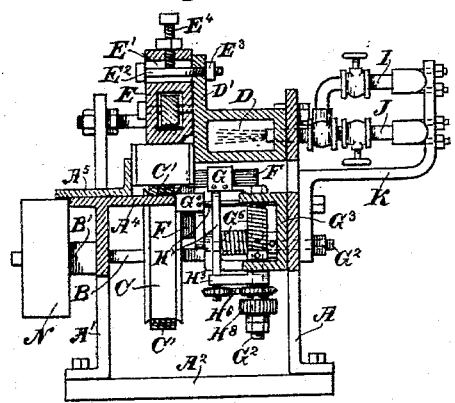
Figure 4:
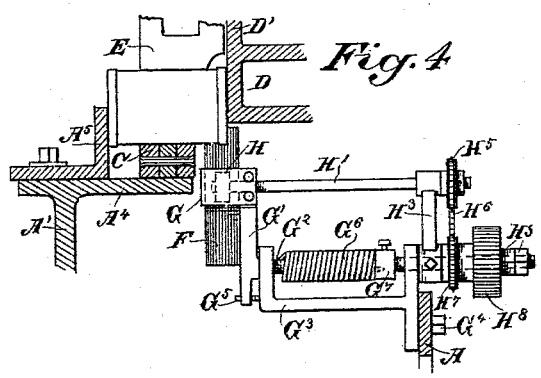
Figure 5:

Referring to the accompanying drawings for a more complete explanation of my invention, Figure 1 is a side elevation of my machine. Fig. 2 is a top view. Fig. 3 is a vertical transverse section taken through the line Z Z at Fig. 1. Figs. 4 and 5 are enlarged detail views of parts of the machine.

The frame of my invention consists of two side pieces A and A', bolted to the base $A^2$ and united at the top by transverse rods $A^3$. A driving-axle B is journaled upon said frame, as shown at B' $B^2$, and at about the center of said axle is secured a pulley C. At the opposite end of the frame an axle $C^3$ is journaled in boxes $C^4$, and this axle carries a pulley $C^2$. Around these pulleys C and $C^2$ passes an endless chain C'. This chain serves to move the cans through the machine from one end to the other, rolling them in contact with a heating-chamber D, which is bolted to the side piece A, and which serves to prevent the melted solder from cooling while the cans are being wiped. This chamber also serves to guide one end of the cans while they are being advanced and wiped.

$A^4$ is a plate projecting at right angles from the side piece A' under the upper line of the chain C' which travels over this plate and is thus kept straight. An angle-plate $A^5$ is clamped to the plate $A^4$ and projects upward, so as to guide the ends of the cans opposite to the heating-chamber. The angle-plate $A^5$ has two oblong holes $A^6$ in it, through which bolts $A^7$ pass and are screwed into the plate $A^4$. This permits the plate $A^5$ to be adjusted to suit different lengths of cans.

A series of weights E are linked together and so situated with relation to the traveling chain that the cans carried by the latter will revolve or roll beneath these weights and thus be held down. The two end weights and the center weight have each an oblong hole E', through which pass bolts $E^2$ which screw into a plate D' projecting upward from the heating-chamber. These bolts $E^2$ are further secured by the jam-nuts $E^3$. A screw $E^4$ is threaded into each of said three weights, and the lower ends of these screws rest on the bolts $E^2$, so that the weights are supported from these bolts, while the oblong holes E' permit adjustment of the same to suit different diameters of cans. This adjustment is effected by turning the screws $E^4$ in one direction or the other. The chamber D may be heated by any suitable means, and the cans moving in contact with it are carried through the apparatus with such speed as to permit the surplus solder being wiped off them before it cools or sets.

The wipers F are in two sets, mounted on oscillating arms so arranged that the first two will act to wipe the ends of the cans, and the second pair engage and wipe the sides of the cans after the ends have been completed. These wipers are preferably made of asbestos, and are all constructed alike. Each wiper is held by a cap G, which is fastened to the free end of an arm G'. This arm is fixed upon a shaft $G^2$, which is journaled in upwardly-projecting ends of an angle-plate $G^3$, and this plate is bolted to the side piece A by bolts $G^4$. The arm G' is held yieldingly against the stop-pin $G^5$ by means of a coiled spring $G^6$, one end of which is fastened to the upwardly-projecting end of the angle-plate $G^3$, and the other end is fastened to a collar $G^7$, which is secured by a set-screw to the stem $G^2$, on which the collar and spring are mounted, as plainly shown in Fig. 4.

A spur-wheel H engages with the wiper F, and is itself secured by a stem or axle $H'$, which is journaled in a hole in the lug $H^2$, projecting from the cap G, Fig. 5, and through another hole in the end of an arm $H^3$, which is secured by a set-screw to the shaft $G^2$. The small shaft or stem $H'$ has a small sprocket-wheel $H^5$ secured upon its end and connected by a sprocket-chain $H^6$ to another sprocket-wheel $H^7$, which is secured to a thumb-collar $H^8$, and the latter two are mounted loosely upon the shaft $G^2$. Two jam-nuts $H^9$ are threaded upon the end of the shaft $G^2$, so that the collar $H^8$ and the sprocket-wheel $H^7$ may be locked sufficiently tight against the arm $H^3$ to prevent its moving while the wiper operates, but loose enough to allow its being turned by the thumb and finger, which action will cause the spur-wheel H to act on the wiper F, and move it either to or from the can, according to the direction in which the thumb-collar is turned.

The wiper may thus be adjusted while the machine is in operation. The heating-chamber may be kept hot by a jet of burning gas, conveyed through pipes I and J, the latter being fastened to an arm K, which is bolted to the frame of the machine.

Between the soldering-machine M and the wiping apparatus is a chute L, which receives the cans from the soldering-machine and guides them into the wiping-machine.

The wipers thus constructed oscillate about their center of support, so that each wiper remains in contact with the can during one-half of the revolution of the latter, and after the can has passed beyond it the second wiper makes contact and finishes the work from where the first one left it. Two wipers thus act to clean the ends of the cans, while the other two act to clean the sides.

The operation will be as follows: Power is applied to the driving-pulley N to revolve it, as indicated by the arrow. The cans delivered from the soldering-machine into the chute L will roll by gravitation upon the top of the chain $C'$, the ends moving between the heating-chamber D and the angle-plate $A^5$, so that the chamber and the plate guide the cans through the machine, while the chain G carries them forward and continually advances the lower portion of the cans with relation to the upper portion, which are pressed upon by the weights E. The weights E act by gravitation on the tops of the cans so that the latter are rolled through the machine under this pressure. As the first can engages the wiper F, the latter will, by reason of its oscillating arm and the yielding spring $G^6$, be moved about its fulcrum-point, while the cans rolling on the upper surface of the chain are continued in engagement with the wiper for more than half of the revolution of the cans. As the can leaves the first wiper, the spring $G^6$ will return it to its original position, where it is arrested by the stop-pin $G^5$, so that it will be in readiness to engage the next following can in a like manner. The can which has passed this wiper will at once engage the next wiper, and this will complete the work of wiping the end of the can. As the can still continues forward, it will next engage the other two wipers successively, and these will in like manner remove the surplus solder from the sides. Each succeeding can undergoes the same operation, and the solder is wiped off it before it has time to set or become hard.

The weights E are for the purpose of insuring the revolution of the cans as they are moved beneath the weights by the action of the traveling chain; but various devices may be substituted for these without materially altering the character of my invention.

It will also be manifest that any oval or angular can may be wiped by this machine by simply holding the cans properly against the wipers while being moved.

Having thus described my invention, what I claim as new, and desire to secure by Letters Patent, is—

1. The combination, in a soldering machine, of a carrier for the cans, oscillating wipers in the path of the cans, arms carrying said wipers, shafts for said arms and springs acting on the shafts for holding the wipers in normal and yielding contact with the cans, means whereby the arms may be moved and the wipers adjusted to and from the cans, and mechanism for operating the carrier.

2. The combination with an endless carrier whereby the cans are advanced and revolved, of a pressure device situated above the cans, whereby they are retained in contact with the chain, so as to be advanced and revolved thereby, and wipers adapted to engage the end seams of the cans, so as to remove surplus solder therefrom, and suitable means whereby the mechanism is actuated.

3. The combination of an endless carrier adapted to advance and rotate the cans, of a pressure device or plate above the cans, fixed oscillating wipers adapted to engage the end seams of the cans, and a heating chamber in contact with which the cans move, whereby the solder is prevented from becoming hard while it is being removed by the wipers.

4. The combination of an endless chain adapted to carry cans on its upper line, with a fixed straight plate below said line of chain to keep it straight, a pressure device between which and the chain the cans pass, whereby the latter are advanced and rotated, wipers fixed yieldingly to engage the end seams of the cans while so advanced, and suitable means for actuating the mechanism.

5. The combination of an endless carrier adapted to rotate and advance the cans, so that the lower surfaces are continually advancing with relation to the upper surfaces, wipers yieldingly mounted upon arms so as to move in contact with the seams of the cans as they pass, and thumb collars connecting with spur wheels by intermediate devices, whereby the wipers may be adjusted to or from the cans while the machine is in operation.

In witness whereof I have hereunto set my hand.

MATHIAS JENSEN.

Witnesses:
ELLA M. RUCKER,
G. C. FULTON.